United States Patent [19]

Catros

[11] Patent Number: 4,583,114
[45] Date of Patent: Apr. 15, 1986

[54] METHOD OF FLOW COMPRESSION OF DATA TRANSMITTED SUCCESSIVELY BETWEEN A TELEVISION TRANSMITTER AND A TELEVISION RECEIVER, AND A SYSTEM FOR CARRYING OUT SAID METHOD

[75] Inventor: Jean-Yves Catros, Rennes, France

[73] Assignee: Thomson-CSF, Paris, France

[21] Appl. No.: 524,346

[22] Filed: Aug. 18, 1983

[30] Foreign Application Priority Data

Aug. 20, 1982 [FR] France ................. 82 14434

[51] Int. Cl.⁴ .............. H04N 11/04; H04N 7/12; H04B 14/06
[52] U.S. Cl. .................... 358/13; 358/135; 375/27
[58] Field of Search ............... 358/13, 135, 136; 375/27, 29, 30, 32

[56] References Cited

U.S. PATENT DOCUMENTS

| | | | | |
|---|---|---|---|---|
| 3,761,613 | 9/1973 | Limb | ................. | 358/136 |
| 3,825,832 | 7/1974 | Frei et al. | ................. | 358/135 |
| 4,144,543 | 3/1979 | Koga | ................. | 358/136 |
| 4,215,374 | 7/1980 | Mizuno | ................. | 358/136 X |
| 4,519,085 | 5/1985 | Catros | ................. | 375/27 |

FOREIGN PATENT DOCUMENTS 2341930 3/1975 Fed. Rep. of Germany .
2402981 4/1979 France .
0012632 6/1980 France .

OTHER PUBLICATIONS

J. Heitmann: "Ein Systemkompatibles Digitales Farbfernsehsignal", Rundfunktechnische Mitteilungen, vol. 20, No. 6, 1976, pp. 236–241.

Primary Examiner—James J. Groody
Assistant Examiner—Michael P. Dunnam
Attorney, Agent, or Firm—Oblon, Fisher, Spivak, McClelland & Maier

[57] ABSTRACT

The method and the system for compression of the flow of data between a television transmitter and a television receiver make provision at the transmitter for a differential coding system comprising a circuit for computation and propagation of coding costs with respect to visibility thresholds at which a coding error becomes apparent on the received image, coding being performed by utilizing at least two different quantization and/or prediction characteristics. A device connected to the differential coding system transmits to the receiver an indication relating to a change in characteristic instead of the data corresponding to the image point to be transmitted when the point is located within an image zone in which the change is necessary. A device is provided at the receiver for reconstructing the data corresponding to the non-transmitted point as a function of data of points already known to the receiver.

11 Claims, 14 Drawing Figures

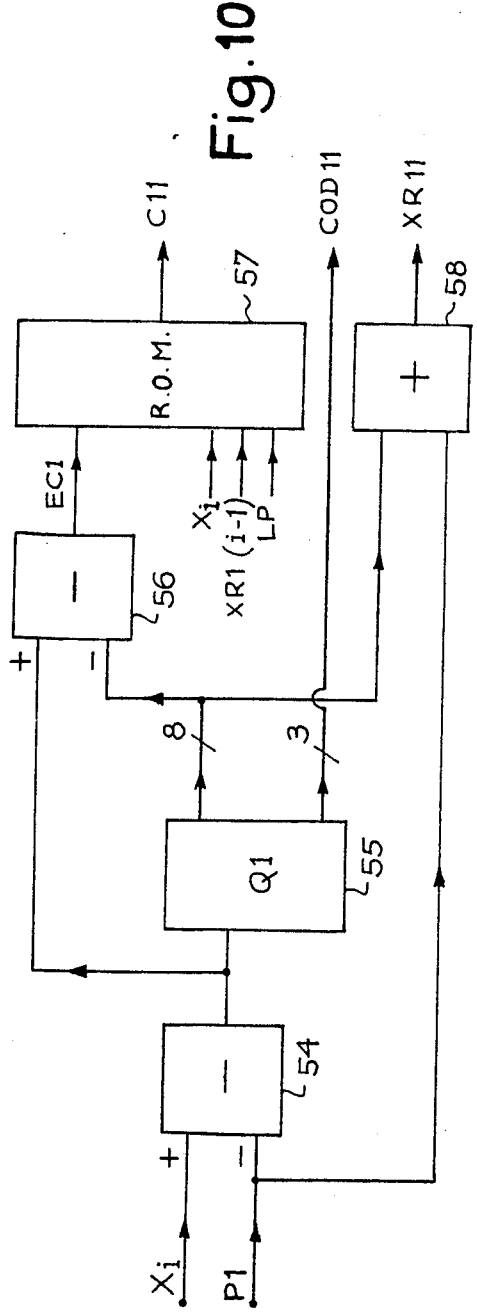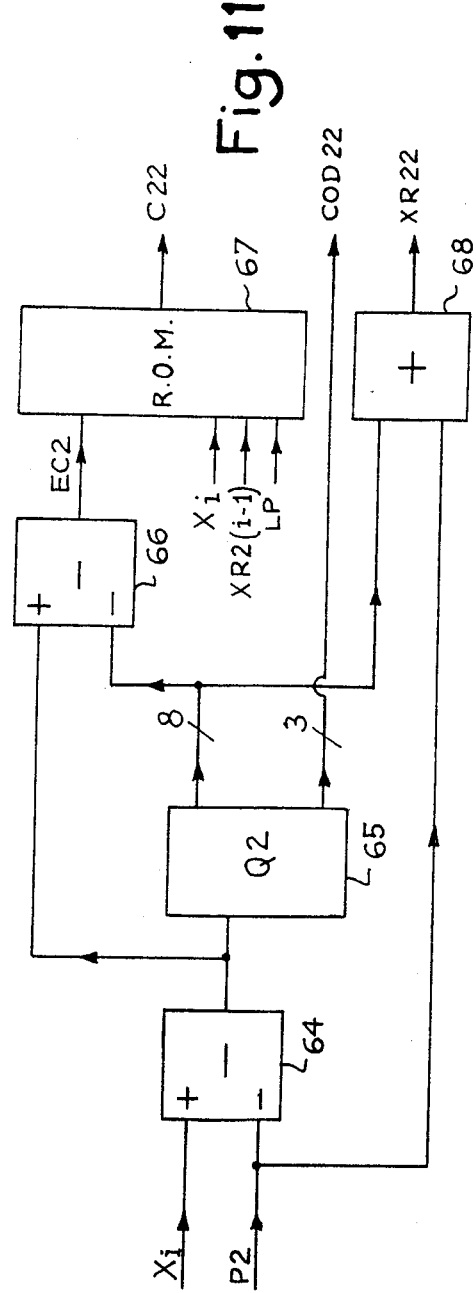

METHOD OF FLOW COMPRESSION OF DATA TRANSMITTED SUCCESSIVELY BETWEEN A TELEVISION TRANSMITTER AND A TELEVISION RECEIVER, AND A SYSTEM FOR CARRYING OUT SAID METHOD

BACKGROUND OF THE INVENTION

This invention relates to a method and a system for compression of the flow of data transmitted between a television transmitter and a television receiver.

In digital television, the luminance and color-difference signals are digitized in eight bits per point with a structure and a sampling frequency which depend on the problem to be solved. These data are usually transmitted in real time and the raw data flow rate is very high, namely in principle higher than 140 megabits/second, thus entailing the need to reduce the flow rate in order to permit the use of existing transmission media.

Different methods and devices for flow reduction are already known. Among these, the methods of coding television signals by modulation of differential coded pulses are particularly attractive by reason of their simplicity of application. They are all the more appreciable by virtue of the fact that the transmitted data are constituted by binary-code words of fixed length, since the problems of management of the buffer memories required for adapting the variable output of the transmitted to the fixed output of the channel which connects the transmitter to the receiver are removed. Furthermore, the use of intra-frame coding avoids the need to make systematic use of frame memories. The known differential coding methods consist in coding the difference between the value of a sample of the signal and an estimation, or prediction, computed from the values of the preceding samples already coded, this difference being quantized by a quantizer having n quantization levels. With each level i is associated a code $C_i$ which is transmitted over the line or transmission channel. The received code is converted to its real value which is then added to a prediction value computed by the receiver in order to reconstruct the signal. By means of a negative-feedback loop, a prediction can be made at the level of the transmitter and is identical with the prediction formulated at the receiver.

Examples of construction of devices for differential coding-decoding of digital data are described in French patent Application No. 81 20167 filed in the name of the present Applicant.

A problem arises, however, when it is sought to apply the methods of differential coding-decoding to transmission of television images, especially when it is desired to obtain a substantial compression of flow of transmitted data. The problem lies in the fact that it is not possible by means of differential coding methods to reduce to less than four bits per image point transmitted with intra-frame coding and a fixed-length code for the luminance component. Below this value, the quality of the reconstructed image is no longer acceptable.

A substantial compression of flow in fact results in spaced quantization levels, thus presenting problems of image reproduction, both in regard to the uniform image zones and in regard to the image contours. It is found that, in the uniform zones of the image, small variations in luminance are directly observed by the eye and that it would consequently be preferable to quantize the luminance signal of the uniform zones by means of quantizers having closely spaced levels in order to prevent excessive amplification of small luminance variations which might otherwise cause false contours to appear in the vicinity of the zero prediction error whereas, on the other hand, and in the case of the image contours which mark the transition between two uniform zones, quantization by means of widely spaced reconstruction levels would be preferable in order to provide better reproduction of the contours. However, in the second case just mentioned, the spacing between two levels cannot exceed a predetermined limit since the contours which appear beyond this limit are reproduced in the form of stair-steps.

In order to solve this problem, one solution consists in changing-over the quantizers to two different quantization characteristics as a function of the local appearance of the image point to be transmitted. For example, in the case of points located in uniform zones of the image, coding will be performed by means of a quantizer having closely-spaced reconstruction levels in the vicinity of the zero prediction error. In the case of points located in zones of image contour or texture, a quantizer having high reconstruction levels will be employed.

The known methods of changeover to different quantization characteristics can be placed in two categories, depending on whether the instant of changeover is transmitted or not.

If the indication of a change in quantization characteristic is not transmitted, the characteristic is obtained in exactly the same manner at the transmitter and at the receiver, from tests performed on image points which are already known at the receiver and constitute the causal neighborhood of the point to be coded. Under these conditions, if a fixed-length code is employed, the output of each image line is constant since the only information to be transmitted is the value of the quantized prediction error. In some cases, however, a problem arises when a causal neighborhood does not alone suffice to find the best characteristic of the quantizer to be employed. This is a particularly crucial problem when the points of the image to be quantized are located within a transition zone between a uniform zone and the zone of image contours.

On the other hand, if the quantization characteristic changeover takes place on points which are not known to the receiver and constitute a non-causal neighborhood for the receiver, the transmitter must necessarily provide the receiver with indications in regard to a change in characteristic. In this case, even if a fixed-length code is employed for coding quantized prediction errors, the output of each image line is variable and problems then arise in regard to the management of the buffer memories required in order to adapt the variable output of the transmitter to the fixed output of the transmission channel.

SUMMARY OF THE INVENTION

The object of the invention is to overcome the disadvantages mentioned in the foregoing.

Accordingly, the invention relates to a method for compression of the flow of data which are transmitted successively between a television transmitter and a television receiver, the data being representative of the values of luminance or of chrominance of each point of a television image and being coded at the transmitter by means of a differential coding device of the type comprising at least one predictor, a quantizer, a device for reconstruction of the transmitted data and a code allocator, said transmitted data being decoded at the receiver by means of a differential decoder comprising at least one code converter, a predictor and a device for reconstruction of the transmitted data; wherein the method comprises the steps of:

determining, prior to transmission, codes to be transmitted as a function of at least two different characteristics $Q_1$ and $Q_2$ of quantization and/or of prediction $P_1$ and $P_2$, transmitting the indication C of a change in characteristic, to the receiver, when coding of the data is obtained by utilizing a characteristic which is different from the characteristic employed for the data previously transmitted, the indication of a change in a characteristic of quantization and/or prediction being transmitted instead of the data relating to the point for which said change takes place, and reconstructing within the receiver the nontransmitted data as a function of the corresponding data of the previous points already received by the receiver.

In accordance with another distinctive feature, and in order to determine the code of the data to be transmitted, the method contemplated by the invention consists in establishing the coding costs and the corresponding codes of the data of each point to be transmitted in respect of each of the characteristics of quantization and/or prediction employed, each cost being obtained by measuring the coding error overshoot in respect of each point above a visibility threshold at which the error becomes apparent on the received image. The method also consists in defining a first series of costs for coding the data of each point by utilizing a first characteristic and in defining a second series of costs for coding the data of each point by utilizing a second characteristic. Each cost of one series is obtained from the costs obtained and corresponding to the coding of the preceding point, by determining the minimum value of the costs computed as a function either of the preceding cost of the same series or of the preceding cost of the other series. The method further consists in determining in each series, by means of a changeover code, each minimum cost which is obtained from the coding cost of the preceding point of the other series and in storing the codes to be transmitted and corresponding to the computed costs of either one series or the other by determining a coding path which alternates on either one series or the other, beginning with those codes of the series in which the last computed cost is lower than the corresponding cost of the other series and continuing successively with the codes of the other series as soon as a changeover code in a series is encountered.

The invention is also concerned with a system for compression of the flow of data transmitted between a transmitter and a receiver, the method outlined in the foregoing being carried into effect by means of said system.

BRIEF DESCRIPTION OF THE DRAWINGS

FIGS. 10, 11, 12 and 13 are schematic representations of the coding devices of FIGS. 8 and 9;

DETAILED DESCRIPTION OF THE INVENTION

Figure 1:
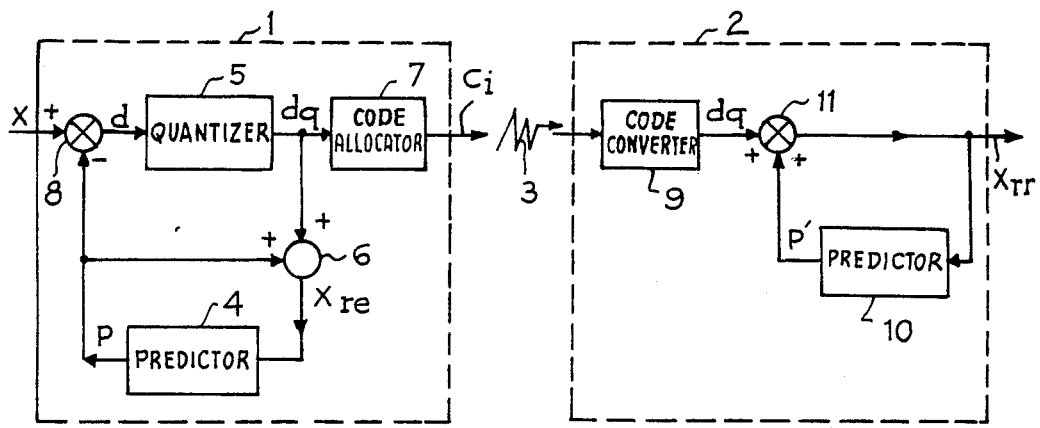
FIG. 1 represents a system for compressing the flow of data transmitted between a transmitter and a receiver by making use of a known type of differential coding-decoding device.

The known differential coding-decoding system shown in FIG. 1 is constituted at the transmitter end by a differential coding device 1 represented within a dashed-line rectangle and at the receiver end by a differential decoding device 2 which is also represented within a dashed-line rectangle. The output of the coding device 1 is connected to the input of the decoding device 2 via a transmission channel 3. The differential coding device 1 comprises: a predictor 4, a quantizer 5, a transmitted datum reconstruction device 6 as well as a code allocator 7. The datum X to be transmitted is applied to the input of a subtracter 8, the other input of which is connected to the output of the predictor 4. The predictor 4 delivers a prediction value P. The datum X to be coded is reduced by the value of the prediction P, then is applied to the input of the quantizer 5 via the output of the subtracter 8 in order to be quantized in n levels. At each quantization level i, a code allocator 7 associates a code $C_i$ which is transmitted over the line or the channel 3. The quantization level dq delivered by the quantizer 5 and corresponding to the difference or error of prediction $X-P$ is applied to one input of the transmitted-datum reconstruction device 6 which is usually constituted by an adder and the other input of which is connected to the output of the predictor 4. The reconstructed datum $X_{re}$ transmitted at the output of the transmitted-datum reconstruction device 6 is applied to the input of the predictor 4. The code $C_i$ is received by the decoding device 2 which is constituted by a code converter 9, a predictor 10 and a received-datum reconstruction device 11. The code converter 9 reconstitutes the quantization levels dq in order to apply them to a first input of the received-datum reconstruction device 11. The received-datum reconstruction device 11, usually consisting of an adder, receives at another input the value of the prediction P' computed by the predictor 10 and delivers at its output the value $X_{rr}$ of the received reconstructed datum.

The quantization operation performed by the quantizer 5 makes it possible to associate with all the values of difference $X-P$ comprised between two thresholds $S_i$ and $S_{i+1}$ a single code value $C_i$. This operation is carried out with the assistance of the code allocator 7 and permits the achievement of flow reduction in differential coding. In the event that there are no transmission errors and since arrangements are made both in the transmission device and in the reception device to have the same prediction functions for the predictors 4 and 10, the reconstructed values $X_{re}$ and $X_{rr}$ respectively at the transmitter and at the receiver are identical. Should this not be the case, these values are different and, inasmuch as the computed prediction value depends on the reconstructed value at the input of the predictor, it is found that in the event of error, the predictions at the transmitter and at the receiver are divergent. In consequence, if no precaution is taken to minimize the transmission errors at the following transmission instants, the following received data are vitiated by errors. Devices for preventing propagation of errors such as those described in French patent Application No. 81 20167 can naturally be employed for the purpose of solving this problem.

Figure 2:
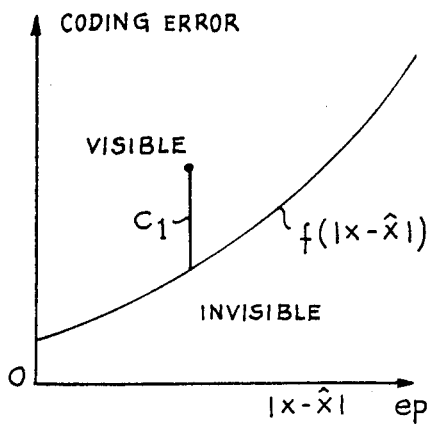
FIG. 2 is a graphical representation of a visibility function and illustrates the method of determination of the coding cost.

The method and the system in accordance with the invention entail the use of a differential coding system which corresponds to that described in FIG. 1, except for the fact that two quantization and/or prediction characteristics instead of one alone are employed at the transmitter and at the receiver. In addition, the invention provides a device for transmitting an indication of a change in characteristic instead of the corresponding point which has to be transmitted when the point is located in an image zone which calls for this change. A device is also provided at the level of the receiver for reconstructing the non-transmitted point as a function of the samples already known to the receiver. In order to achieve this result, the method in accordance with the invention consists in minimizing a function which records the coding errors in respect of a predetermined number of points above a threshold defined by a visibility function of said errors. The recording function can be selected according to the applications and can be either the simple sum of visibilities of coding errors or else the sum of the squares, or of the cubes, or of the $n^{th}$ powers of visibilities of the coding errors. The coding error corresponds either to the prediction error $X-P$, reduced by its quantized value $Q(X-P)$ where Q represents the quantization characteristic employed, or to the difference between the datum X and the reconstructed value of the preceding datum. The visibility function determines the threshold above which the coding error becomes apparent in the received image. For the sake of enhanced simplicity of construction, the points considered in this mode of computation are those constituting a television image line. A graph of a visibility function is given in FIG. 2. The difference $(X-\hat{X})$ representing the divergence between the value X, of the datum of the point to be coded, and a reconstructed value $\hat{X}$ of the point obtained from the points which are adjacent to the point to be coded, is plotted as abscissae. This form of construction is not unique. Depending on the applications, other visibility functions could naturally be chosen together with other values for graduating the axis of abscissae. For example, the axis of abscissae could be graduated in accordance with the values of a function $g(X_i)$ where $X_i$ can equally represent either image points to be coded (source image) or points which have already been coded and are represented by prediction errors $ep = X-P$ or divergences $X-\hat{X}$ between the point and its reconstructed value.

There is associated with each coding error a cost $C_1$ which is zero in respect of any error below the threshold defined by the visibility function and which is, for example, proportional to the value of the error which exceeds the threshold value. By way of example, in order to minimize the sum of coding errors located above the visibility threshold, in respect of all the points of an image line, there will be employed a method of dynamic programming which, at each image point, will propagate two paths each having an assigned cost which is defined by means of a visibility function. The illustration of this method is given in FIGS. 3 and 4. Since two quantization characteristics $Q_1$ and $Q_2$ can be employed for coding each image point, each image point can be represented by two different characteristic states of coding, resulting from the use of either of the two quantization characteristics.

Figure 3:
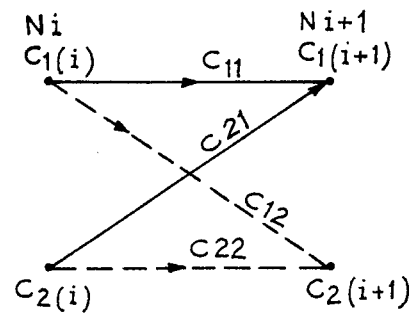
FIGS. 3 and 4 illustrate the method of determination of the minimum coding path for coding each point of the image.

In the description which now follows, state 1 will designate the state which results from coding of a point with the first quantization characteristic $Q_1$ and state 2 will designate the state which results from coding of a point with the second quantization characteristic $Q_2$. It will naturally be understood that, as a function of the foregoing, each state will be characterized by a coding cost $C_1$ or $C_2$. Thus, as shown in FIG. 3, there are assigned to the states of the points Ni and Ni+1 the costs $C_{1(i)}$ and $C_{1(i+1)}$ in state 1, and $C_{2(i)}$ and $C_{2(i+1)}$ in state 2. Starting from the point Ni, two paths are possible in order to place the following point Ni+1 in state 1. A first path consists in starting directly from state 1 of the preceding point and adding a cost $C_{11}$, and a second path consists in starting from state 2 of the preceding point and adding a cost $C_{21}$. Similarly, in order to place the point Ni+1 in state 2, two paths are possible by starting either directly from state 2 of the preceding point Ni and adding a cost $C_{22}$ or by starting from state 1 of the preceding point Ni and adding a cost $C_{12}$. In order to compute the cost $C_{1(i+1)}$ of the point Ni+1, the minimum value of the costs which are necessary in order to arrive at the point Ni+1 along either of the two paths is computed, which corresponds to the following formula:

$$C_{1(i+1)} = \text{MIN}(C_{1(i)} + C_{11}; C_{2(i)} + C_{21}).$$

Similarly, in order to define the cost $C_{2(i+1)}$ of the point Ni+1, the costs which make it possible to arrive at the point Ni+1 in state 2 by means of either of the two paths is computed in accordance with the following formula:

$$C_{2(i+1)} = \text{MIN}(C_{2(i)} + C_{22}, C_{1(i)} + C_{12}).$$

Figure 5:
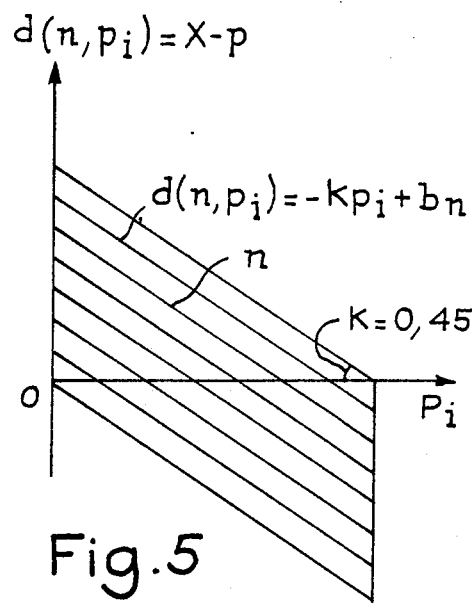
FIG. 5 is a representation of a quantization characteristic employed for coding the points to be transmitted in contour zones of the image.

In these formulae, $C_{11}$ represents the cost involved in changing-over from the point Ni to the point Ni+1 by making use of the quantization characteristic $Q_1$; $C_{22}$ represents the cost involved in changing-over from the point Ni to the point Ni+1 by making use of the quantization characteristic $Q_2$; $C_{21}$ represents the cost involved in changing-over from the quantization characteristic $Q_2$ employed for the computation at the point Ni to the quantization characteristic $Q_1$ employed for the computation at the point Ni+1; and $C_{12}$ represents the cost involved in changing-over from the use of the quantization characteristic $Q_1$ at the point Ni to the use of the quantization characteristic $Q_2$ at the point Ni+1. As a function of the costs obtained by traversal of one path or the other in order to arrive at the point Ni+1 in state 1 or in state 2, coding of the point Ni+1 is determined in accordance with the path which involves the lowest cost. This coding operation can be carried out by utilizing the two quantization characteristics shown in FIGS. 5 and 6. FIG. 5 represents a quantization characteristic which is employed especially for the purpose of coding the points located in contour zones or highly textured zones of the image.

This characteristic is linear and is defined by an array of parallel lines in a system of rectangular coordinates in which there are placed on the axis of abscissae the prediction values $P_i$ and on the axis of ordinates the prediction errors of the $d(nPi) = X - P$ such that:

$$D(n, Pi) = kP_i + b_n$$

where k is smaller than or equal to 1, n represents the code allocated as a function of the prediction value $P_i$ and of the prediction error $X-P$, $b_n$ represents the prediction error in respect of the zero prediction level.

In the example of application of the invention, in order to code a prediction error with three bits, seven quantization levels can be employed. A value of K in the vicinity of 0.45 can be chosen.

Figure 6:
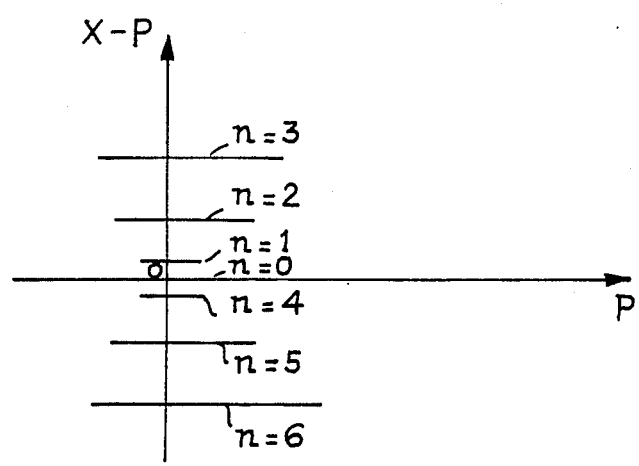
FIG. 6 is a representation of a quantization characteristic employed for coding the points located in uniform zones of the image.

FIG. 6 represents the quantization characteristic which is employed in order to code the image points located in uniform zones of the image and which is a seven-level linear characteristic having closely-spaced levels in the vicinity of the zero prediction error.

Figure 4:
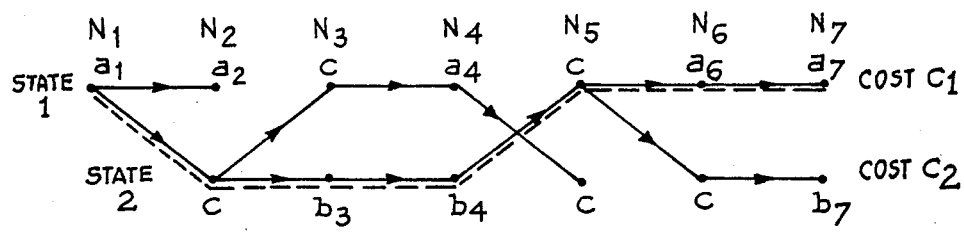

The method of calculation of codes to be transmitted and of reconstructed values will now be described with reference to the diagram of FIG. 4. Starting from the costs $C_{1(i-1)}$ and $C_{2(i-1)}$ which are known in the case of the point $Ni-1$, the method computes the costs $C_{1(i)}$ and $C_{2(i)}$ in respect of the point Ni by means of the method of minimization of a coding-error recording function described earlier. To this end, the method utilizes the datum $X_i$ of the current point of the television signal, the value of the datum of the preceding reconstructed point $XR_{i-1}$ and the reconstructed data of certain points of the previous line. The precise points to be employed depend on the prediction and reconstruction functions which are chosen. Since use is made of different quantization characteristics, a point Ni to be coded entails the need to compute two reconstructed values and two codes, a first reconstructed value $XR_{1(i)}$ and a first code $COD_{1(i)}$ in order to place the point Ni in state 1, a second reconstructed value $XR_{2(i)}$ and a second code $COD_{2(i)}$ in order to place the point Ni in state 2. These values are stored in memory in the order of processing of the points on each image line, and the propagation of costs in the manner shown in FIG. 3 continues up to the end of each line. At the end of the line, the minimum value of the costs $C_1$ or $C_2$ obtained in respect of the last point of the line initializes the search for a coding path in which the cost of the coding error is at a minimum. At each point Ni of the line, the method consists in selecting one out of the two possibilities of codes and of the following reconstructed values $(XR1_{(i)}, COD_{1(1)})$ or $(XR_{2(i)}, COD_{2(i)})$ in order to give the value $COD_i$ of the code to be transmitted and the reconstructed value $XR_{(i)}$. The choice between these values is governed by the code values read in the manner shown in FIG. 4. For the sake of simplification, the example shown in FIG. 4 is constituted by one line comprising seven points numbered from $N_1$ to $N_7$. The values $a_i$ and $b_i$ represent the codes stored in two code memories $MCOD_1$ and $MCOD_2$ designated respectively by the reference numerals 22 and 24 and shown in FIG. 7. The letter C designates the changeover code which is stored in one of the two memories $MCOD_1$ or $MCOD_2$ when, at the point Ni considered, the method of minimization of errors and of computation of minimum cost in respect of said point has shown the need to change the quantization characteristic. Thus in FIG. 4, the method of propagation of costs involves a transition from the point $N_1$ in state 1 to the point $N_2$ in state 2. In order to note this transition or changeover, a code designated as C is stored in the memory $MCOD_2$ instead of the corresponding code of the point $N_2$. Similarly, in order to arrive at the point N from the point $N_2$, two paths are possible, by proceeding either from state 2 of the point $N_2$ to state 1 of the point $N_3$ or by proceeding from state 2 of the point $N_2$ and remaining in state 2 at the point $N_3$. It is noted that, under these conditions, state 2 of the point $N_3$ has not changed and that, in this case, the corresponding code $b_3$ is stored in the memory $MCOD_2$ that, on the other hand, the change in characteristic which is made in order to pass from state 2 of the point $N_2$ to state 1 of the point $N_3$ is designated in the case of the point $N_3$ by the code C which is stored in the memory $MCOD_1$. It is also noted that, in the case of the point $N_4$, no change occurs in the propagation of costs when starting from the point $N_3$ and that a code $a_4$ is consequently stored in the memory $MCOD_1$ corresponding to state 1 of the point $N_4$ and that a code $b_4$ is stored in the memory $MCOD_2$ corresponding to state 2 of the point $N_4$. At the point $N_5$, the propagation of costs derived from the point $N_4$ imposes simultaneously a change in characteristics when proceeding from state 1 of the point $N_4$ or from state 2 of the point $N_4$, this change being designated by the letter C as before and a changeover code is stored in respect of the point $N_5$ in both of the code memories $MCOD_1$ and $MCOD_2$. It is also worthy of note that, in the case of the points $N_6$ and $N_7$, propagation of costs does not call for any operation involving a change of characteristic when proceeding from the point $N_5$ and remaining in state 1 and that, on the other hand, a change of characteristic is essential in order to arrive in state 2 of the point $N_6$ since the cost propagation produces a change of characteristic. A changeover code C is therefore stored in the memory $MCOD_2$ in the case of the point $N_6$ in order to note this change. In the case of the point $N_7$ which represents the end-of-line point, a code $a_7$ is stored in the memory $MCOD_1$ and a code $b_7$ is stored in the memory $MCOD_2$. Furthermore, at the point $N_7$, the method of propagation of costs gives rise to a coding error bearing a cost $C_1$ in respect of state 1 of the point $N_7$ and a coding error bearing a cost $C_2$ in respect of state 2. Again assuming in the example shown in FIG. 4 that the cost $C_1$ obtained at the point $N_7$ is lower than the cost $C_2$, the method for determining the optimum coding path will consist in reading the code located within either of the two memories $MCOD_1$ or $MCOD_2$, starting with the code memories representing the points in state 1 (that is, the memory $MCOD_1$) and in changing the memory when a changeover code C is encountered in the succession of codes which are read. The dashed line in FIG. 4 represents the succession of codes which will be read in accordance with this principle. Reading of the memory $MCOD_1$ will thus be performed in a first step from the point $N_7$ to the point $N_5$ and the codes $a_7$, $a_6$ and C will be read. Then, at the instant of indication of a changeover C of the point $N_5$, reading of the code memory 1 will be interrupted and will be followed by reading in the memory $MCOD_2$ from the point $N_4$ to the point $N_2$ at which the codes $b_4$, $b_3$ and C will be read successively. When arriving at the point $N_2$ at which a changeover code is read, reading of the memory $MCOD_2$ will be interrupted and then followed by further reading of the memory $MCOD_1$ in order to read the code of the point $N_1$. Thus the train of codes which will be delivered will be defined by the series of codes: $a_1$, c, $b_3$, $b_4$, c $a_6$, $a_7$. The choice of the reconstructed values $XR_1$ and $XR_2$ at the transmitter is naturally made by using the same changeover code C.

The system for carrying out the method in accordance with the invention will now be described with reference to FIGS. 7 to 14. The device shown in FIG. 7 comprises: a device 12 for propagation of the costs $C_1$ and $C_2$ as well as a device 13 for computing reconstructed values and codes. The device 12 is constituted by two circuits 14, 15 for propagation of costs in the case of all the points of one line of the image when computation of the coding errors is performed respectively by means of the first and second quantization characteristics $Q_1$ and $Q_2$, the points of the image to be coded being placed respectively in states 1 and 2 defined earlier. A cost propagation circuit 14 computes the overall cost $C_{1(i)}$ in order to arrive in state 1 at the point Ni, the reconstructed value $XR_{1(i)}$ of the point Ni as well as the code $COD_{1(i)}$ obtained and corresponding to the overall cost $C_{1(i)}$. The overall cost $C_{1(i)}$ obtained on one output of the cost propagation circuit 14 is stored by a storage circuit 16. Similarly, the reconstructed value $XR_{1(i)}$ obtained on one output of the cost propagation circuit 14 is stored within a storage circuit 17 In like manner, the cost propagation circuit 15 computes the overall cost $C_{2(i)}$ which is necessary in order to place the point Ni in state 2; the corresponding reconstructed value $XR_{2(i)}$ obtained by means of the quantization characteristic $Q_2$ and the code $COD_2$ correspond the overall cost $C_{2(i)}$ obtained. The overall cost $C_{2(i)}$ supplied by a corresponding output of the cost propagation circuit 15 is stored within a storage circuit 18. Similarly, the reconstructed value $XR_{2(i)}$ is obtained on one output of the propagation circuit 15 and stored within a storage circuit 19. Computation of the overall costs $C_{1(i)}$ and $C_{2(i)}$, of the reconstructed values and $XR_{1(i)}$ and $XR_{2(i)}$ of the corresponding codes $COD_1$ and $COD_2$ is performed as a function of the current datum $X_{(i)}$ of the point to be coded, of the overall costs $C_{1(i-1)}$, $C_{2(i-1)}$ obtained in the calculations performed on the preceding point Ni−1 and stored respectively in the storage circuits 16 and 18, of the reconstructed values $XR_{1(i-1)}$ and $XR_{2(i-1)}$ of the datum corresponding to the preceding point Ni−1 and stored in the storage circuits 17 and 19, and also as a function of the reconstructed values LP of the previous line which are stored in a storage circuit 20.

The device 13 for computing the codes and reconstructed values is constituted by an array 21, 22, 23, 24 of *first-in, first-out* (FIFO) stack registers, a multiplexer 25, a storage circuit 26 for reconstructed values in respect of all the points of a line, a storage circuit 27 for codes to be transmitted as well as a circuit 28 for controlling the inputs of the multiplexer 25. The control circuit 28 comprises a circuit 29 for initialization of the state of the multiplexer 25 at the end of image lines, as well as a circuit 30 which permits a change of state of the multiplexer 25 each time a changeover code is encountered during traversal of the optimum coding path defined earlier, starting from the optimum state in the case of the last point of the line. The initialization circuit 29 is composed of a circuit 31 for computing the minimum overall cost supplied respectively by the cost propagation circuits 14 and 15 as well as a circuit 32 for storing the minimum overall cost obtained at the end of an image line. The state-changing circuit 30 of the multiplexer 25 is constituted by a decoder 33 for the changeover code C. The output of said decoder 33 is connected to the input of a flip-flop 34 which changes state each time a changeover code C is decoded by the coder 33. The outputs of the storage circuit 32 and of the flip-flop 34 are connected respectively to the control inputs $C_1$ and $C_2$ of the multiplexer 25. As a function of the state of the outputs of the storage circuit 32 and of the flip-flop 34, the multiplexer 25 connects the output of the stack memory 21 or the output of the stack memory 23 to the input of the device 26 for storing reconstructed values. As a function of said output states, said multiplexer 25 also connects the output of the stack register 22 or the output of the stack register 24 to the input of the device 27 for storing the codes to be transmitted. In this manner, if the multiplexer-initialization circuit 29 finds at the end of a line that the minimum coding cost for the last point has been obtained by the cost propagation circuit 14, the reading priority of the stack memories 21 to 24 will be given to the memories 21 and 22 containing respectively the stacked reconstructed values $XR_1$ and codes $COD_1$ of all the points placed in state 1 of the line, as obtained by utilization of the first quantization characteristic $Q_1$. These successively read values will be transferred successively and respectively into the circuits 26 for storage of reconstructed values and into the circuit 27 for storage of the codes to be transmitted. If a changeover code is encountered during reading of the nemory 22 and decoded by the decoder 33, the flip-flop 34 causes the multiplexer 25 to change state and switches the inputs of the storage circuits 26 and 27 to the outputs of the stack registers 23 and 24 which contain respectively the reconstructed values and the corresponding codes of the points placed in state 2 and computed by means of the quantization characteristic $Q_2$. Since the flip-flop 34 changes state each time a changeover code is encountered when reading the stack registers 22 or 24, it is apparent that the multiplexer 25 switches the inputs 26 and 27 alternately to one of the outputs of the registers 21, 22 or 23, 24 each time a changeover code is encountered. It will readily be understood that initialization of the multiplexer 25 can start from the second state of the last point of a line in the event that the initialization circuit 29 should find at the end of a line that the coding cost of the last point supplied by the cost propagation circuit 15 is lower than that supplied by the cost propagation circuit 14. In this case, reading of the codes to be transmitted and of the reconstructed values would begin with reading of the stack memories 23 and 24.

Figure 8:
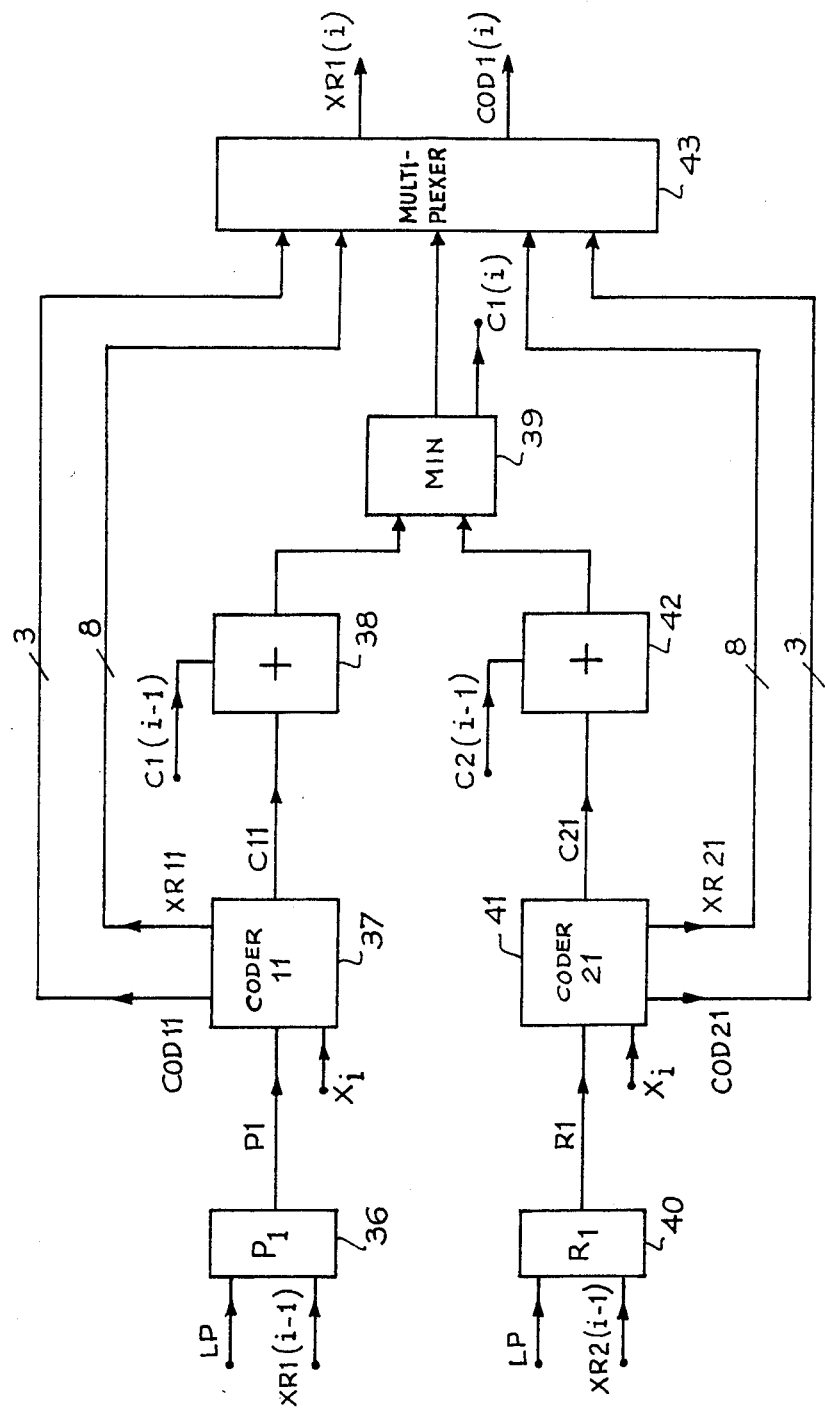
FIGS. 8 and 9 illustrate embodiments of the devices for propagation of coding errors of the device of FIG. 7.

The cost propagation circuit 14 is shown in FIG. 8. This circuit comprises a circuit 36 for computing a prediction value $P_1$ by means of a first prediction characteristic. Said circuit 36 is connected by means of a first input to the output of the circuit 20 for storing the reconstructed values of the previous line and by means of its second input to the output of the circuit 17 for storing the reconstructed value $XR_{(i-1)}$ of the previous point. The output of the circuit 36 is connected to a first input of a circuit 37 for computing the coding cost $C_{11}$ when the first quantization characteristic $Q_1$ is employed. The computation circuit 37 is connected to a first input of an adder 38 for transmitting the value of the computed cost $C_{11}$ to the adder 38. A second input of the adder 38 is connected to the output of the storage circuit 16 which contains the coding cost $C_{1(i-1)}$ of the previous point when the first quantization characteristic is employed. The adder 38 performs the addition of the costs $C_{11}$ and $C_{(i-1)}$ and transmits the result to a first input of a circuit 39 for computing the overall cost $C_{1(i)}$.

The cost propagation circuit 14 further comprises a circuit 40 for computing the reconstructed value ($R_1$). Said circuit 40 is connected by means of a first input to the output of the circuit 20 for storing the reconstructed values of the previous line and by means of its second input to the output of the circuit 19 for storing the reconstructed value $XR_{2(i-1)}$ of the previous point in order to arrive at the point Ni in state 2. The circuit 40 is also connected by means of its output to a first input of a circuit 41 for computing the coding cost $C_{21}$. The computing circuit 40 is connected to a first input of an adder 42 in order to transmit the value of the computed cost $C_{21}$ to the adder 42. A second input of the adder 42 is connected to the output of the storage circuit 18 which contains the coding cost $C_{2(i-1)}$ of the previous point when the second quantization characteristic $Q_2$ is employed. The adder 42 performs the addition of the costs $C_{21}$ and $C_{2(i-1)}$ and transmits the result to a second input of the circuit 39 for computing overall costs $C_{1(i)}$.

The computing circuits 37 and 41 also compute respectively the codes $COD_{11}$ and $COD_{21}$ as well as the reconstructed values $XR_{11}$ and $XR_{21}$ corresponding to the previously calculated costs $C_{11}$ and $C_{21}$.

Figure 7:
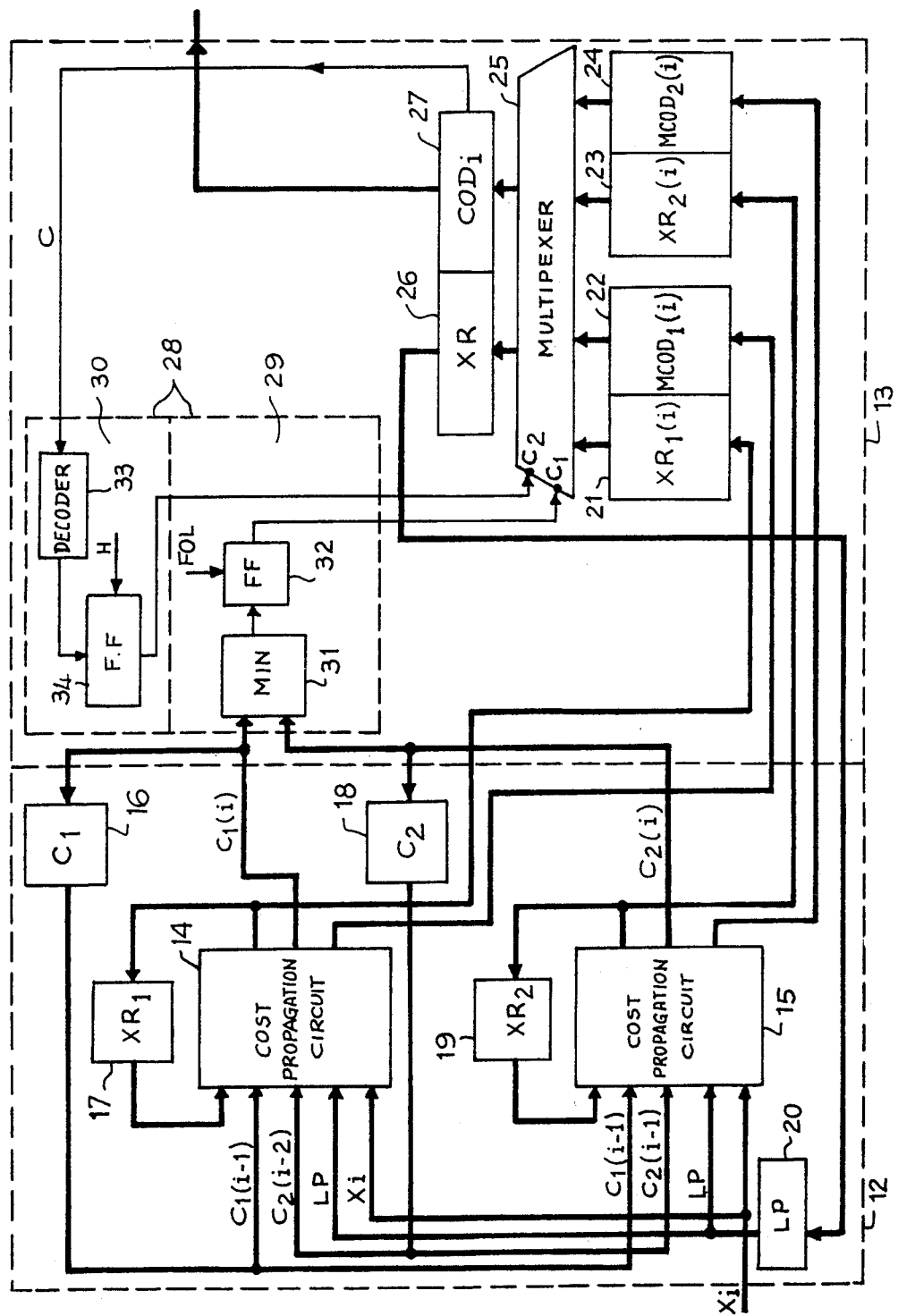
FIG. 7 is a representation of the device for the emission of codes in accordance with the invention.

A multiplexer 43 controlled by the output of the circuit 39 for computing the overall cost connects the outputs of the computing circuit 37 which supplies the code value $COD_{11}$ and the reconstructed value $XR_{11}$ or connects the outputs of the computing circuit 41 which supplies the code value $COD_{21}$ and the reconstructed value $XR_{21}$ to the respective inputs of the stack memories 22 and 21 of FIG. 7.

Thus, when the computing circuit 39 finds that the cost computed by the adder 38 is lower than the cost computed by the adder 42, the multiplexer 43 is controlled so as to transmit the code $COD_{11}$ and the reconstructed value computed by the circuit 37 to the input of the stack memories 21 and 22. In the event of the contrary, when the cost computed by the adder 42 is lower than the cost computed by the adder 38, only the code $COD_{21}$ and the reconstructed value $XR_{21}$ computed by the computing device 41 are transmitted to the inputs of the stack memories 21 and 22.

Figure 9:
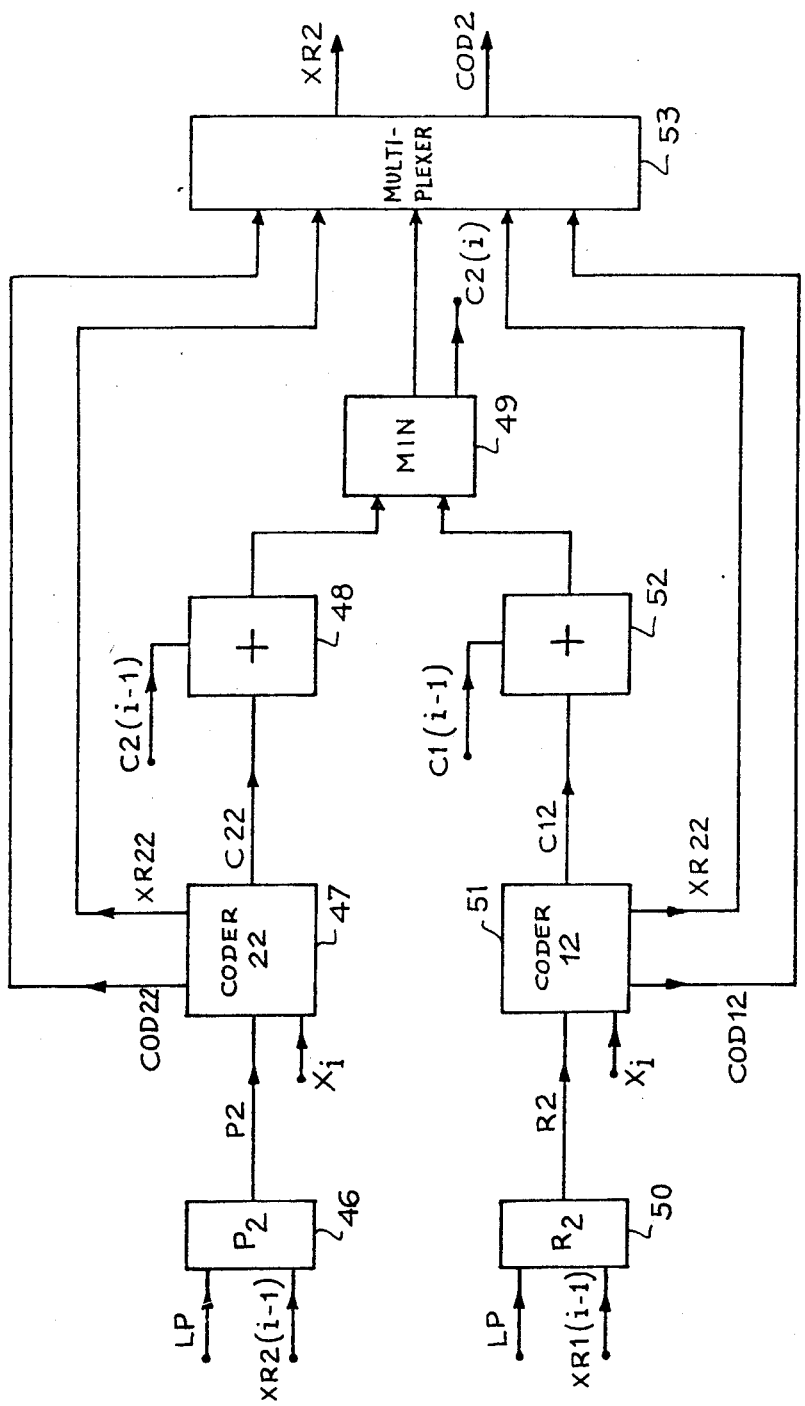

The cost propagation circuit 15 shown in FIG. 9 is identical with the circuit 14 shown in FIG. 8 except for the input-output connections between the circuit 15 and the other elements shown in FIG. 7. It is for this reason that, in FIG. 9, the same elements as those of FIG. 8 are designated by references increased by ten. In consequence, the connections between the elements 46 to 53 of FIG. 9 do not need to be described at greater length. It will be recalled, however, that the circuit 15 shown in FIG. 9 carries out the propagation of costs which makes it possible to code the points by making use of the second quantization characteristic $Q_2$. This circuit realizes the function $$C_{2(i)} = MIN(C_{2(i-1)} + C_{22}; C_{1(i-1)} + C_{12}).$$

The cost $C_{22}$ is computed by the computing circuit 47 as a function of the prediction value $P_2$ supplied by the predictor 46 by means of a second prediction characteristic and as a function of the input datum of the current point $X_i$ by utilizing the second quantization characteristic $Q_2$. The circuit 47 also supplies the code $COD_{22}$ and the reconstructed value $XR_{22}$. The computing circuit 51 computes the cost value $C_{12}$ attached to the use of a reconstruction function which is in turn a function of the value of the input datum $X_i$ of the current point and of a reconstructed value $R_2$ produced by the reconstruction circuit 50. The computing circuit 51 also computes the code value $COD_{12}$ and the reconstructed value $XR_{22}$ which correspond to the conditions of computation of the cost $C_{12}$. The adder 48 adds the cost values $C_{22}$ and $C_{2(i-1)}$ and the adder 52 performs the addition of the costs $C_{12}$ and $C_{1(i-1)}$. The minimum value of the overall costs obtained by the circuits 48 and 52 is computed by the computing circuit 49 which controls the multiplexer 53 in order to select, as a function of the result obtained, a code value and a reconstructed value from the outputs of the computing circuit 47 or from the outputs of the computing circuit 51. The code value $COD_2$ and the reconstructed value $XR_2$ selected by the multiplexer 53 are transmitted to the inputs of the stack registers 23 and 24 of FIG. 7. The predictor 46 has a first input connected to the output of the circuit for storing the reconstructed values of the previous line 20 and a second input connected to the output of the circuit 19 for storing the previous point. A first input of the reconstruction circuit 50 is connected to the output of the circuit 20 for storing the reconstructed values and a second input of said circuit 50 is connected to the output of the circuit 17 for storing the reconstructed value of the previous point.

One form of construction of the circuit 37 for computing the coding cost $C_{11}$ in order to change-over from coding of the point $Ni-1$ to coding of the point Ni by utilizing the first quantization characteristic $Q_1$ is shown in FIG. 10. This circuit comprises a subtracter 54, a quantizer 55, a coding-error computing device 56, a device 57 for establishing the code $C_{11}$ as a function of the coding error delivered by the device 56, of the datum of the current point $X_i$, of the reconstructed value of the previous point $XR_{1(i-1)}$ and of the reconstructed values of the points of the previous line LP. The computing device further comprises a device 58 for computing the reconstructed value $XR_{11}$. The subtracter 54 receives on a first input the value X of the datum representing the current point Ni and on a second input the value $P_1$ of the prediction computed by the predictor 36. The subtracter 54 delivers at its output a prediction error $X_i - P_1$ to the input of the quantizer 55 for computing the code $COD_{11}$, the quantization characteristic of which is that which corresponds to the graph shown in FIG. 5. The prediction error $X_i - P_1$ is also transmitted to a first input of the coding-error computing device 56 which receives on its second input the quantized prediction error supplied by the quantizer 55. The coding-error computing device can be realized by means of a simple subtracter. The coding error computed by the coding-error computing device 56 is transmitted to the address inputs of a programmable read-only memory (ROM) 57 which is also addressed as a function of the value of the datum $X_i$ of the point Ni, of the reconstructed values of the adjacent points found in the register 17, of the reconstructed value $XR_{1(i-1)}$ of the previous point or in the circuits 20 for storing the reconstructed values of the points of the previous line. The programmable read-only memory 57 contains in memory the cost values $C_{11}$ corresponding to the coding errors which are higher than the visibility threshold defined by a visibility function of the type shown in FIG. 2. When the coding error delivered by the circuit 56 is higher than the visibility threshold corresponding to the divergence between the datum $X_i$ of the current point Ni and the reconstructed value of the adjacent points, a certain cost $C_{11}$ is delivered at the output of the memory 57 and this cost $C_{11}$ can be zero if the coding error is lower than the corresponding visibility threshold value. In the example of FIG. 10, the device 58 for computing the reconstructed value is realized by means of a simple adder which adds the value of the prediction $P_1$ delivered by the predictor 36 to the quantized prediction error $Q(X-P_1)$ delivered by the quantizer 55 in order to form the reconstructed value $XR_{11}$.

One example of construction of the circuit for computing the cost $C_{22}$ is shown in FIG. 11. Since this circuit is identical with the circuit of FIG. 10, the elements of FIG. 11 which correspond to the elements of FIG. 10 are designated by the same reference numerals increased by 10. In the same manner as in FIG. 10, the programmable memory 67 delivers a cost $C_{22}$ which represents the difference between a coding error computed by the circuit 66 and a visibility threshold defined by a visibility function of the type shown in FIG. 2, as a function of the difference existing between the datum $X_i$ of the current point and the reconstructed values of the points adjacent to the current point such as in particular the reconstructed value $XR_{2(i-1)}$ of the previous point. The coding error delivered by the circuit 66 corresponds to the difference between the prediction error $X_i - P_2$ delivered by the subtracter 64 and the quantized prediction error $Q(X_i - P_2)$ delivered by the quantizer 65 which utilizes the second quantization characteristic $Q_2$ in order to calculate the code $COD_{22}$. The quantization characteristic $Q_2$ corresponds to that shown in FIG. 6. The quantizer 65 also delivers the corresponding code $COD_{22}$ at its output.

Figure 12:
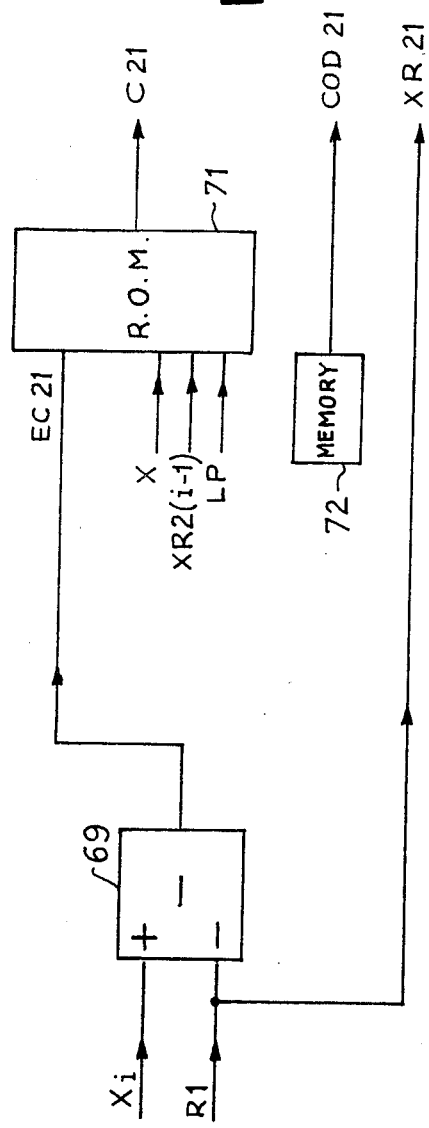

The circuit for computing the cost $C_{21}$ in order to place the point $Ni+1$ in state 1 when starting from state 2 of the point Ni is shown in FIG. 12. This circuit comprises a subtracter 69 which receives on a first input the datum $X_i$ to be coded of the current point Ni and on its second input the reconstructed value $R_1$ of the previous point as a function of the adjacent points. The output of the subtracter 69 is connected to an addressing input of a programmable ROM memory 71 which contains a visibility function of the coding error, the output of which delivers a value of coding cost $C_{21}$. The memory 72 contains the code $COD_{21}$ corresponding to the change of quantizer required by this operation. By way of example, said code $COD_{21}$ can have the binary value 111.

Figure 13:
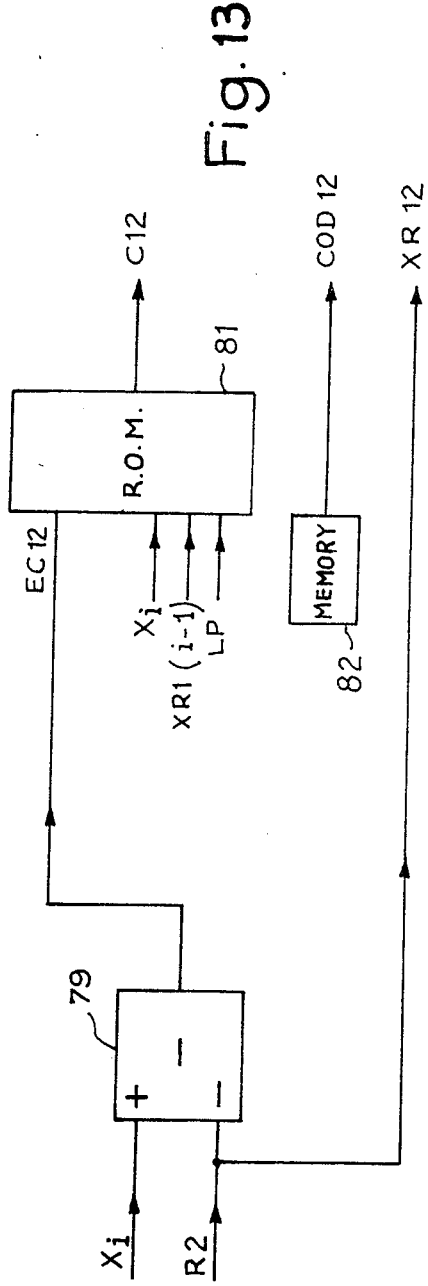

The device illustrated in FIG. 13 shows the details of construction of the device 51 for computing the coding cost $C_{12}$ of FIG. 9. This device contains elements which are similar to those already described in connection with FIG. 12 and consequently bear the references of the similar elements of FIG. 12 increased by ten. The subtracter 79 computes the coding error $EC_{12}$ corresponding to the difference between the current datum $X_i$ of the current point and the reconstructed value $R_2$ of the adjacent points delivered by the reconstructor 50 of FIG. 9. The code $EC_{12}$ is transmitted on an address line of the programmable ROM memory 81 and this latter contains a visibility function of the coding error which is similar to that shown in FIG. 2 in order to calculate the cost $C_{12}$ as a function of the coding error $EC_{12}$ and of the values of the datum of the current point $X_i$, of the reconstructed values of the previous point $XR_{1(i-1)}$ and of the reconstructed values of the previous line found in the storage device 20. Since the computed cost $C_{12}$ corresponds to a change of state, the memory 82 contains the changeover code $COD_{12}$ which corresponds to the binary value 111, for example, as in the case of FIG. 12 The reconstructed value $XR_{12}$ is taken directly from the input of the subtracter 79 which receives the reconstructed value $R_2$.

Figure 14:
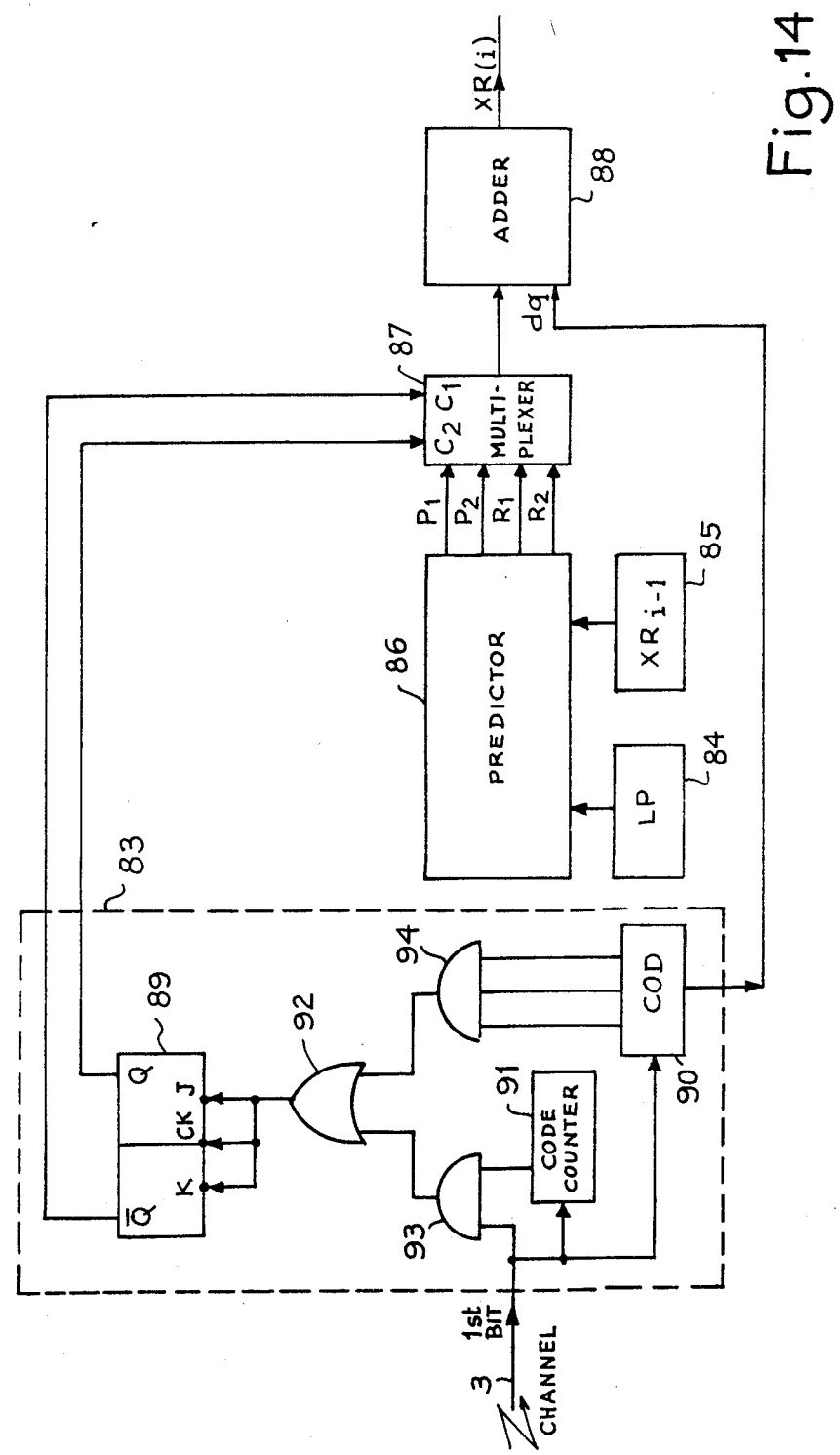
FIG. 14 shows an embodiment of the receiving device.

The mode of construction of the receiving device is shown in FIG. 14. The receiving device comprises a control unit 83, a device 84 for storing the reconstructed values of the previous line, a device 85 for storing the reconstructed value $XR_{(i-1)}$ of the previous point, a predictor 86, a multiplexer 87 and an adder 88. The control unit 83 is constituted by flip-flop 89 for producing a change of state of prediction characteristic, a code storage register 90 and a code counter 91. The inputs j, K, and CK of the flip-flop 89 are coupled to the output of a two-input OR-gate 92, the first input being connected to the transmission channel 3 via a two-input AND-gate 93. The second input of the OR-gate 92 is connected to the output of an AND-gate 94 having three inputs which are connected respectively to the outputs of the register 90 for the storage of received codes. The first bit received on the transmission channel 3 initializes counting of the code counter 91 and sets the flip-flop 89 in the logic state 1 if the first bit received has the logic value 1 or leaves the flip-flop 89 in the logic state 0 when the first bit received has the value 0. The flip-flop 89 then changes state each time a change of code is indicated by the value of the changeover code C (equal to 111) derived from the transmission channel The changeover code C is decoded by the AND-gate 94 which assumes a logic state 1 at its output when the changeover code is stored within the code register 90. The predictor 86 computes the prediction values $P_1$ and $P_2$ and two values of reconstructed data $R_1$ and $R_2$. These values are computed in exactly the same manner as those obtained by the predictor of the transmitter by means of the values of the data reconstructed in the previous line and found in the register 84 and by means of the reconstructed value of the previous point found in the register 85. The multiplexer 87 controlled by the outputs Q and $\overline{Q}$ of the flip-flop 89 selects one of the values $P_1$, $P_2$, $R_1$ or $R_2$ in order to apply said value to a first input of the adder 88, the other input of which is connected to the output of the code register 90 which contains the quantized prediction error $d_q$ transmitted via the transmission channel 3. The corresponding reconstructed value is transmitted to the output of the adder 88.

Although the principles of the present invention have been described above in relation to particular examples of construction, it must be understood that the description has been given solely by way of example and does not limit the scope of the invention in any sense. In particular, it will be understood that the method which has just been described and which consists in carrying out commutations between two quantization characteristics as a function of the local waveform of the television signal remains the same in its basic principle if commutation is carried out only on different predictors or prediction characteristics by making use of one and the same quantization characteristic for computation of codes to be transmitted in order to place each point in two different coding states. It should also be noted that the structure of the coding device shown in FIG. 7 can be realized in accordance with several alternative forms of execution which will be dictated in the majority of instances by the choice of the prediction functions (P₁,P₂) and reconstruction functions (R₁,R₂) of the predictors (36, 46) and reconstructors (40, 50). In the event that the prediction and reconstruction functions consist simply in re-using the value of the datum of the point previously reconstructed in the line, the devices described in the foregoing will not require any particular adaptation The entire process can in fact be performed by making use of two delay lines, the emission of the codes of a line J being performed at the same time as the computation of the codes relating to the points of the line J+1 by the device 13 and at the same time as propagation of the coding costs relating to the points of the line J+2 by the device 12.

On the other hand, in the event that the prediction and reconstruction functions take into account the reconstructed data of the points of the previous line, it will no longer be possible to utilize the sequence involving transmission and preparation of the codes as described in the foregoing. The reason for this is that, in order to propagate the costs of the line J, it is necessary to make use of the reconstructed values of the previous line whereas they will be available only at the moment of scanning of the points of line J+2 and the time-delay increases in this case.

In order to overcome this drawback, a first solution can consist in making use of an image memory for storing the first and the second field of the image, emission of the codes of line J of the first field and computation of the codes of line J of the second field being carried out simultaneously during propagation of costs of line J+1 of the first field. Conversely, emission of the codes of line J of the second field and computation of the codes of line J+b 1 of the first field are performed simultaneously during propagation of costs of line J+1 of the second field A second solution consists in coding the lines of the image alternately in one direction and in the other by utilizing a line memory. In this manner, the reconstructed values of the previous line are available for propagation of the coding costs of the following line.

What is claimed is:

1. A method for compression of the flow of data transmitted successively between a television transmitter and a television receiver, the data being representative of the values of luminance or of chrominance of each point of a television image and being coded at the transmitter by means of a differential coding device of the type comprising at least one predictor, a quantizer, a device for reconstruction of the transmitted data and a code allocator, said transmitted data being decoded at the receiver by means of a differential decoder comprising at least one code converter, a predictor and a device for reconstruction of the transmitted data; wherein the method comprises the steps of:

determining, prior to transmission, codes to be transmitted as a function of at least two different characteristics $Q_1$ and $Q_2$ of quantization and/or of prediction $P_1$ and $P_2$, transmitting the indication C of a change in characteristic, to the receiver, when coding of the data is obtained by utilizing a characteristic which is different from the characteristic employed for the data previously transmitted, the indication of a change in a characteristic of quantization and/or prediction being transmitted instead of the data relating to the point for which said change takes place, and reconstructing within the receiver the non-transmitted data as a function of the corresponding data of the previous points already received by the receiver wherein the data-coding operation comprises establishing the coding costs and the corresponding codes of the data of each point to be transmitted in respect of each of the characteristics of quantization and/or prediction employed, each cost being obtained by measuring the coding error overshoot in respect of each point, above a visibility threshold at which the error becomes apparent on the received image, in defining a first series $C_{1(i)}$ of costs, for coding the data of each point by utilizing a first characteristic, and a second series $C_{2(i)}$ of costs, for coding the data of each point by utilizing a second characteristic, each cost of one series being obtained from the costs obtained and corresponding to the coding of the preceding point by determining the minumum value of the costs computed as a function either of the preceding cost of the same series or of the preceding cost of the other series; in determining in each series, by means of a changeover code C, each minimum cost which is obtained from the coding cost of the preceding point of the other series; and in storing the codes to be transmitted and corresponding to the computed costs of either one series or the other by determining a coding path which alternates on either one series or the other, beginning with those codes of the series in which the last computed cost is lower than the corresponding cost of the other series and continuing successively with the codes of the other series as soon as a changeover code in a series is encountered.

2. A system for compression of the flow of data transmitted in a television transmitter and television receiver comprising:

means for representing the values of luminance and chrominance of each point of a television image contained within said television transmitter by way of differential coding;

means for establishing coding costs and the corresponding codes of the data of each point to be transmitted as a function of at least two different characteristics $Q_1$ and $Q_2$ of quantization and/or prediction $P_1$ and $P_2$, each cost being calculated by means for calculating the coding error overshoot with respect to each point, above which a visibility threshold the error becomes apparent on said received images;

where said calculating means including:

first calculating means for calculating a first series of costs $C_{1(i)}$ of costs and for coding the data of each point utilizing a first characteristic;

second calculating means for calculating a second series $C_{2(i)}$ of costs and for coding the data utilizing a second characteristic;

means contained in each of said first and second calculating means to calculate the cost of each of the respective series by obtaining said cost obtained and corresponding to the coding of the preceding point by determining the minimum value of the costs computed as a function of the preceding cost in both series and for selecting the minimum cost series;

first determining means coupled to said first and second calculating means for producing a changeover code C and for obtaining the coding cost of the preceding point of the non-selected series;

storing means for the codes to be transmitted;

second determining means coupled to said first determining means for determining a coding path which alternates on either of the two series in accordance with the minimum cost series selected by said first and second calculating means and for continuing with said coding upon receipt of a changeover code C;

means for performing the differential coding in said transmitter comprising:
   at least one predictor;
   a quantizer;
   a device for reconstruction of said transmitted data; and
   a code allocater;

means for transmitting the changeover code C;

differential decoding means contained within said receiver for decoding said received data comprising:
   at least one code converter;
   a predictor;
   a device for reconstruction of said transmitted data; and C code receiving means coupled to said decoder means for upon receipt of a C code switching to the appropriate code converter.

3. A system according to claim 2 wherein the transmitter and receiver are interconnected by means of a transmission channel, the system further comprising:
   a differential coding device in the transmitter which comprises a cost propagation device for computing the coding cost of each point as a function, on the one hand, of a first and a second characteristic of quantization and/or of prediction and, on the other hand, as a function of coding costs determined in respect of the preceding points, as well as a means for computation of the codes and of the reconstructed data values, for selecting the codes to be transmitted along a coding path in which the propagation of costs is at a minimum.

4. A system according to claim 3, wherein the device for propagation of costs comprises a first cost propagation circuit, for computing the first cost series and for coding the data of each point by utilizing the first quantization characteristic $Q_1$, and a second cost propagation circuit, for computing the second series of costs and for coding the data of each point by utilizing the second quantization characteristic $Q_2$.

5. A system according to claim 4, wherein the means for computing the codes and reconstructed data values comprises: a first assembly of elements for storing codes and corresponding reconstructed data values delivered by the first cost propagation circuit; a second assembly of elements for storing the codes and corresponding reconstructed data values delivered by the second cost propagation circuit, the first and second storage assemblies being arranged in a stack; as well as a multiplexer for reading the codes to be transmitted in either of the two storage assemblies, the reading of codes stored successively in one storage element being interrupted for reading the codes of the following ranks stored in the other storage element as soon as a changeover code C is encountered in the series of codes contained in the storage element which is being read.

6. A system according to claim 5, wherein reading of the elements for storing the codes and reconstructed data values is initiated at the end of an image line by an initialization circuit and begins with the storage element which has been loaded by the cost propagation circuit whose coding cost propagated at the last point of the line is of minimum value.

7. A system according to claim 6, wherein the first and second cost propagation circuits comprise: a first circuit, for computing the coding cost of the current image point on the basis of the reconstructed data values corresponding to the preceding point by utilizing the same quantization characteristic as that employed for coding the preceding image point, the first circuit for computing the coding cost being connected by means of its output to a first input of an adder whose other input is connected to a storage device for storing the cost of coding the preceding image point carried out by utilizing the same quantization characteristic; a second circuit, for computing a coding cost on the basis of the reconstructed data values of the preceding image point and obtained from a quantization characteristic which is different from that employed by the first circuit for computing the coding cost, the second computing circuit being such as to contain in memory a quantization-characteristic changeover code and being connected by means of its output to a first input of a second adder whose other input is connected to a storage circuit for storing the cost of coding of the preceding point when the coding is obtained by utilizing a quantization characteristic which is different from that employed by the first computing circuit, the outputs of the first and second adders being connected to the inputs of a circuit for computing the overall cost in order to determine the lowest cost delivered by the outputs of the first and second adders, in order to select the code and the reconstructed data values delivered by the first or the second coding-cost computing circuit which delivers the lowest cost and in order to transfer the value of the code and the selected reconstructed data values into the corresponding storage elements of the device for computing codes and reconstructed data values.

8. A system according to claim 7, wherein the first circuit for computing costs of coding of the current image point comprises a read-only memory in which are stored the values of the costs corresponding to coding errors which are higher than the visibility thresholds of said errors when utilizing a first or a second quantization characteristic, the read-only memory being addressed, on the one hand, by a coding-error computing device for establishing the difference between the prediction error of the current point to be coded and its quantized value by means of a quantization characteristic and, on the other hand, by the values of the data of the current point of the image and of those of reconstructed adjacent points.

9. A system according to claim 7, wherein the second circuit for computing costs of coding of the current image point comprises a read-only memory in which are stored the values of costs corresponding to coding errors which are higher than the visibility thresholds of said errors when the code of the current point is replaced by a characteristic changeover code, the read-only memory being addressed, on the one hand, by a coding-error computing device for establishing the difference between the datum representing the current point and its reconstructed data value as a function of the values of the data of the preceding points and, on the other hand, by the values of the data of the current point and those of reconstructed adjacent points.

10. A system according to claim 8, wherein the device for decoding at the receiver is a double differential decoder device comprising a predictor for computing the two prediction values $P_1$ and $P_2$ and two reconstructed data values $R_1$ and $R_2$ which are computed in exactly the same manner as those of the transmitter and selected in either case each time a changeover code is received by the receiver.

11. A system according to claim 10, wherein the first and second quantization characteristics are identical and in which the means for computing the codes make use of different prediction characteristics.

* * * * *